US012659283B2

(12) United States Patent     (10) Patent No.:   US 12,659,283 B2

Herzog et al.                  (45) Date of Patent:     Jun. 16, 2026

(54) EMAIL TEXT ENHANCEMENT USING MACHINE LEARNING

(71) Applicant: MICROSOFT TECHNOLOGY LICENSING, LLC., Redmond, WA (US)

(72) Inventors: Erga Herzog, Mazkeret Batya (IL); Noam Koenigstein, Tel Aviv (IL); Itzik Malkiel, Ramat Gan (IL); Yakir Yehuda, Tirat Carmel (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 18/915,049

(22) Filed: Oct. 14, 2024

(65) Prior Publication Data

US 2026/0106849 A1     Apr. 16, 2026

(51) Int. Cl.
    *H04L 51/06*       (2022.01)
    *G06F 40/40*       (2020.01)

(52) U.S. Cl.
    CPC .............. *H04L 51/06* (2013.01); *G06F 40/40* (2020.01)

(58) Field of Classification Search
    CPC ................................. H04L 51/06; G06F 40/40
    See application file for complete search history.

(56) References Cited

U.S. PATENT DOCUMENTS

| | | | |
|---|---|---|---|
| 10,353,994 B2 * | 7/2019 | Upadhyay ............ | G06Q 10/107 |
| 2009/0083140 A1 * | 3/2009 | Phan .................. | G06Q 30/0254 |
| | | | 705/14.52 |

| | | | |
|---|---|---|---|
| 2017/0161372 A1 * | 6/2017 | Fernández ............ | G06F 40/211 |
| 2023/0297766 A1 | 9/2023 | Mackey et al. | |
| 2023/0308472 A1 * | 9/2023 | Boyer ..................... | G06F 40/40 |

OTHER PUBLICATIONS

"Datasets:Isotonic marketing_email_samples", Retreived from: https://huggingface.co/datasets/Isotonic/marketing_email_samples, Retrieved on: Jul. 4, 2025, 3 Pages.

"Vector embeddings", Retrieved from: https://platform.openai.com/docs/guides/embeddings, Retrieved on Jul. 4, 2025, 7 Pages.

Aakanksha Chowdhery, et al., "PaLM: Scaling Language Modeling with Pathways", retrieved from http://arxiv.org/abs/2204.02311, Oct. 5, 2022, 87 pages.

Achiam, et al., "GPT-4 Technical Report," arXiv, arXiv:2303.08774v6 [cs.CL], Mar. 4, 2024, 100 pages.

(Continued)

*Primary Examiner* — El Hadji M Sall

(74) *Attorney, Agent, or Firm* — Seed Intellectual Property Law Group LLP

(57)         ABSTRACT

An original email text is evaluated against a set of properties to identify shortcomings in the natural language, format, and structure used in the original email text. The properties represent characteristics needed to enhance the original mail text to a professionally-written style. A first machine learning model identifies the missing properties or characteristics in the original email that exist given a few-shot context. The few-shot context includes labeled email samples containing the desired properties. A second machine learning model is used to generate an enhanced email given the original email, personal data relevant to the content of the original data, the missing properties and the few-shot context.

20 Claims, 7 Drawing Sheets

(56) References Cited

OTHER PUBLICATIONS

Brown, et al., "Language Models are Few-Shot Learners", In Proceedings of the 34th Conference on Neural Information Processing Systems, May 2020, 25 Pages.

Devlin, et al., "BERT: Pre-training of Deep Bidirectional Transformers for Language Understanding", In Proceedings of Conference of the North American Chapter of the Association for Computational Linguistics: Human Language Technologies, Jun. 2, 2019, pp. 4171-4186.

Nicola, et al. "Sentiment analysis for customer relationship management: an incremental learning approach." Applied intelligence 51, Nov. 12, 2020, pp. 3339-3352.

Ouyang, et al., "Training language models to follow instructions with human feedback," in Advances in Neural Information Processing Systems, 2022, 15 pages.

Qingxiu, et al., "A Survey on In-context Learning", In Repository on arXiv:2301.00234v6 [cs.CL] Oct. 5, 2024, 22 Pages.

Touvron, et al., "Llama 2: Open Foundation and Fine-Tuned Chat Models", In Repository of arXiv:2307.09288v2, Jul. 19, 2023, pp. 1-77.

Vaswani, et al., "Attention Is All You Need", In Proceedings of 31st Conference on Neural Information Processing Systems, Dec. 4, 2017, 11 Pages.

International Search Report and Written Opinion received for PCT Application No. PCT/US2025/037470, mailed on Nov. 21, 2025, 13 pages.

* cited by examiner

200

300

| Property | Success Percentages | |
| --- | --- | --- |
| | Original Emails | Enhanced Emails |
| Clear call to action | 100% | 100% |
| Clear value proposition | 100% | 100% |
| Personalized | 52% | 62% |
| Sense of urgency | 6% | 16% |
| Pain points and recipient needs | 100% | 100% |
| Professional | 100% | 100% |
| Not too wordy | 63% | 74% |
| Balanced exclamation usage | 50% | 62% |
| Confident | 100% | 100% |
| Concise | 67% | 76% |
| No spam-related words | 100% | 100% |

Figure 5:
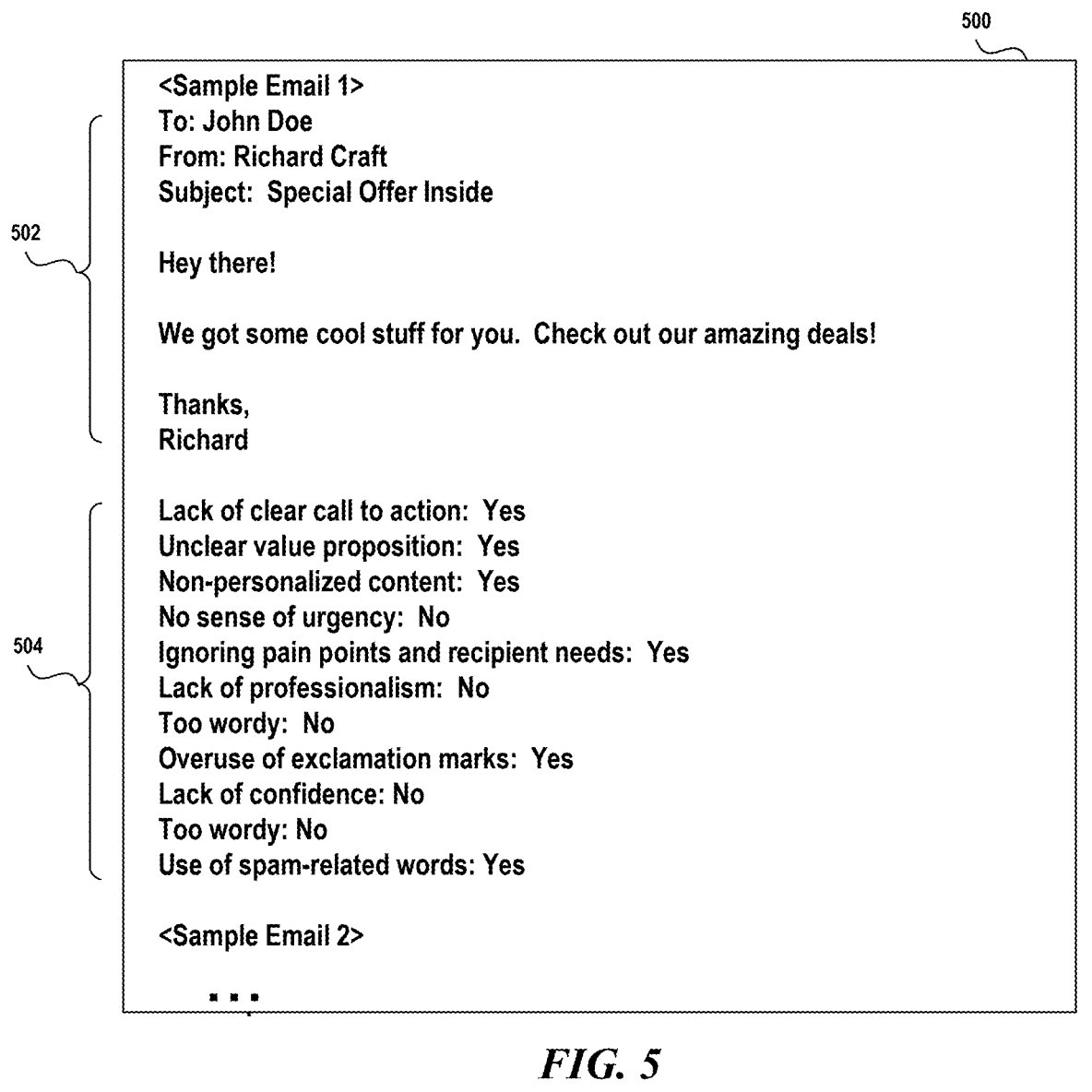

<Sample Email 1>
To: John Doe
From: Richard Craft
Subject: Special Offer Inside

502

Hey there!

We got some cool stuff for you. Check out our amazing deals!

Thanks,
Richard

Lack of clear call to action: Yes
Unclear value proposition: Yes
Non-personalized content: Yes
No sense of urgency: No
Ignoring pain points and recipient needs: Yes
Lack of professionalism: No
504
Too wordy: No
Overuse of exclamation marks: Yes
Lack of confidence: No
Too wordy: No
Use of spam-related words: Yes <Sample Email 2>

Figure 6:
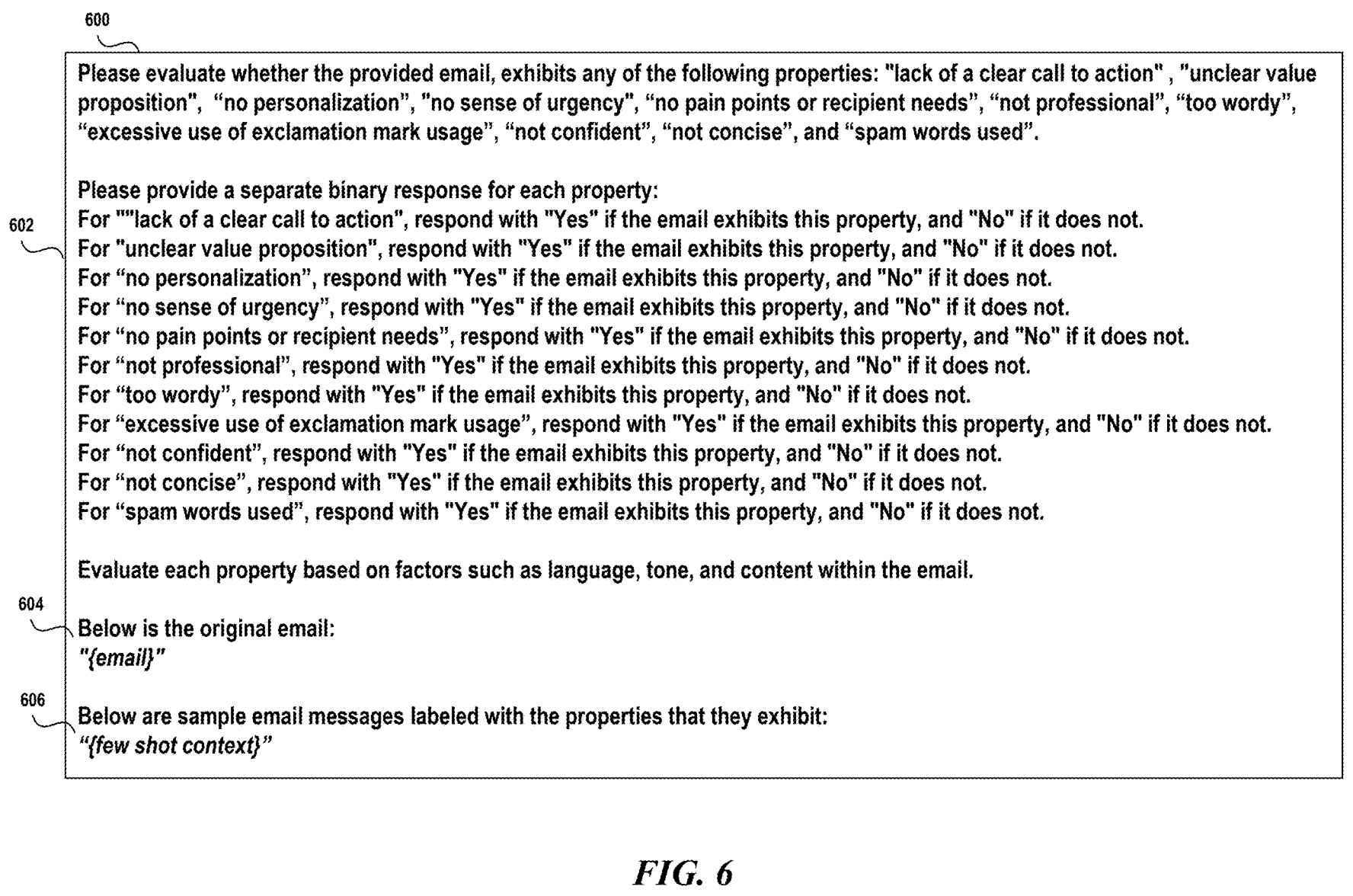

Please evaluate whether the provided email, exhibits any of the following properties: "lack of a clear call to action", "unclear value proposition", "no personalization", "no sense of urgency", "no pain points or recipient needs", "not professional", "too wordy", "excessive use of exclamation mark usage", "not confident", "not concise", and "spam words used".

Please provide a separate binary response for each property:

For "lack of a clear call to action", respond with "Yes" if the email exhibits this property, and "No" if it does not.

For "unclear value proposition", respond with "Yes" if the email exhibits this property, and "No" if it does not.

For "no personalization", respond with "Yes" if the email exhibits this property, and "No" if it does not.

For "no sense of urgency", respond with "Yes" if the email exhibits this property, and "No" if it does not.

For "no pain points or recipient needs", respond with "Yes" if the email exhibits this property, and "No" if it does not.

For "not professional", respond with "Yes" if the email exhibits this property, and "No" if it does not.

For "too wordy", respond with "Yes" if the email exhibits this property, and "No" if it does not.

For "excessive use of exclamation mark usage", respond with "Yes" if the email exhibits this property, and "No" if it does not.

For "not confident", respond with "Yes" if the email exhibits this property, and "No" if it does not.

For "not concise", respond with "Yes" if the email exhibits this property, and "No" if it does not.

For "spam words used", respond with "Yes" if the email exhibits this property, and "No" if it does not.

Evaluate each property based on factors such as language, tone, and content within the email.

Below is the original email:
"{email}"

Below are sample email messages labeled with the properties that they exhibit:
"{few shot context}"

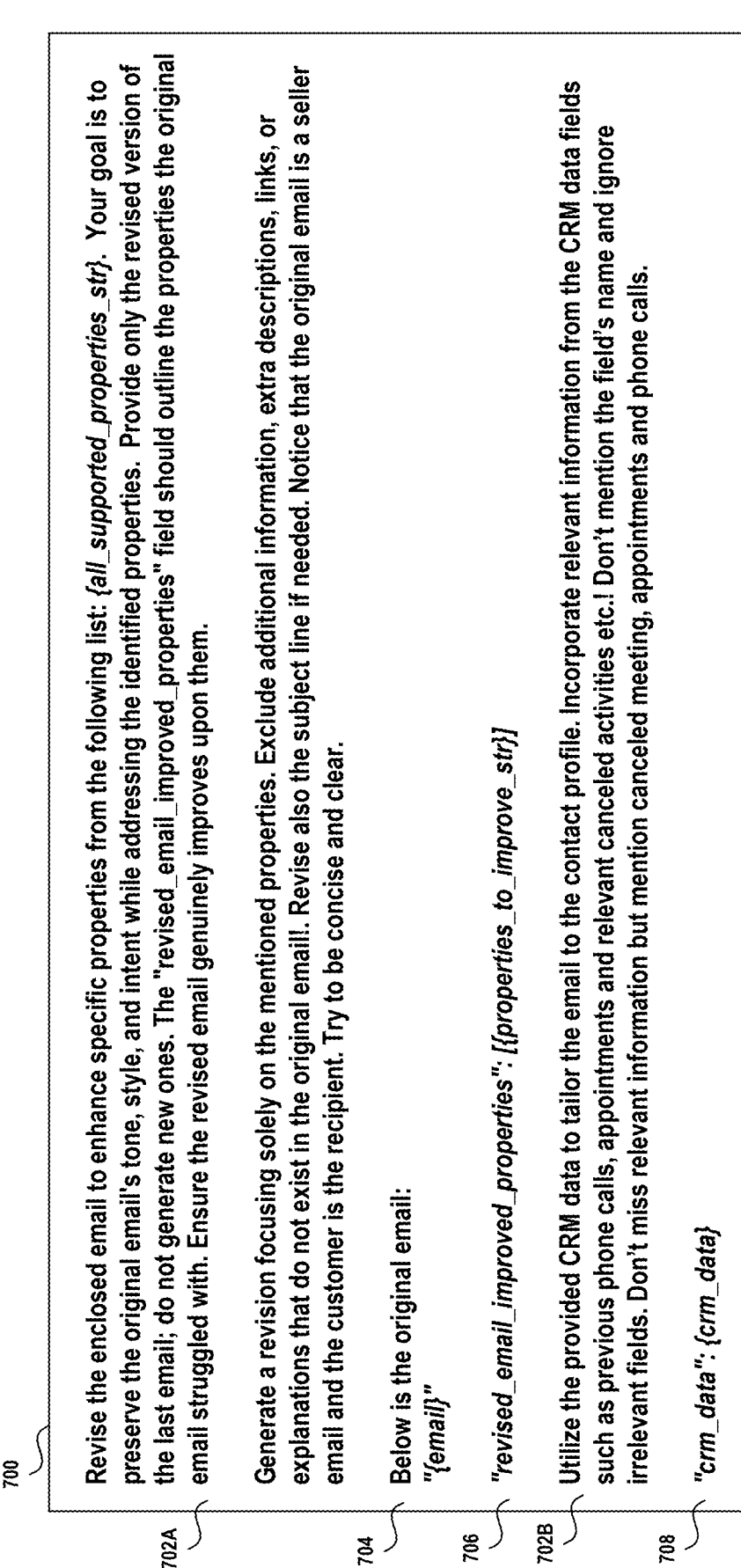

Revise the enclosed email to enhance specific properties from the following list: *{all_supported_properties_str}*. Your goal is to preserve the original email's tone, style, and intent while addressing the identified properties. Provide only the revised version of the last email; do not generate new ones. The "revised_email_improved_properties" field should outline the properties the original email struggled with. Ensure the revised email genuinely improves upon them.

Generate a revision focusing solely on the mentioned properties. Exclude additional information, extra descriptions, links, or explanations that do not exist in the original email. Notice that the original email is a seller email and the customer is the recipient. Revise also the subject line if needed. Try to be concise and clear.

Below is the original email:
*"{email}"*

*"revised_email_improved_properties"*: *[{properties_to_improve_str}]*

Utilize the provided CRM data to tailor the email to the contact profile. Incorporate relevant information from the CRM data fields such as previous phone calls, appointments and relevant canceled activities etc.! Don't mention the field's name and ignore irrelevant fields. Don't miss relevant information but mention canceled meeting, appointments and phone calls.

*"crm_data"*: *{crm_data}*

*FIG. 7*

EMAIL TEXT ENHANCEMENT USING MACHINE LEARNING

BACKGROUND

Email communications are paramount to communications within the workplace. Email is a fast and cost-effective way to transmit messages and has a wide reach to a large number of people. It avoids delays incurred by traditional communication means. Email may be accessed world-wide with an internet connection and serves as a record of a conversation.

Well-written emails that are presented in a professional style addressing concerns raised in a sender's email using grammatically-correct language goes a long way of establishing goodwill and credibility. However, at times, an email may be overlooked, a response maybe poorly crafted, or does not respond to a request.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A framework is generated to enhance an email message to include characteristics of a professionally-written email. A machine learning model is used to analyze an original email text for the existence of the characteristics or properties of a professionally-written email. The machine learning model is given a few labeled email texts exhibiting the desired properties for the machine learning model to learn the context of each property. The framework obtains personalized data relevant to the content of the email message. An enhanced email communication is then generated by a machine learning model given missing properties, the personalized data, the original email, and the few-shot context.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 3 is a table illustrating a comparison of the success percentages, per property, between the original and enhanced emails.

FIG. 5 is a schematic diagram illustrating an exemplary few shot context.

FIG. 6 is a schematic diagram illustrating an exemplary prompt to a machine learning model for the model to identify missing properties in an email text.

FIG. 7 is a schematic diagram illustrating an exemplary prompt to a machine learning model for the model to generate an enhanced email text.

DETAILED DESCRIPTION

Overview

Aspects of the present disclosure pertain to the automation of the generation of an enhanced email communication using machine learning models. An original email text is evaluated against a set of properties to identify shortcomings in the natural language, format, and structure used in the original email text. The properties represent characteristics needed to enhance the original mail text to a professionally-written style. A first machine learning model identifies the missing properties or characteristics in the original email text that exist given a few-shot context. The few-shot context includes labeled email samples illustrating the desired properties or lack thereof. A second machine learning model is used to generate an enhanced email given the original email text, personal data relevant to the content of the original data, the missing properties and the few-shot context.

Attention now turns to a more detailed description of the components, methods, processes, and system for automating the generation of an enhanced email text message.

System

Figure 1:
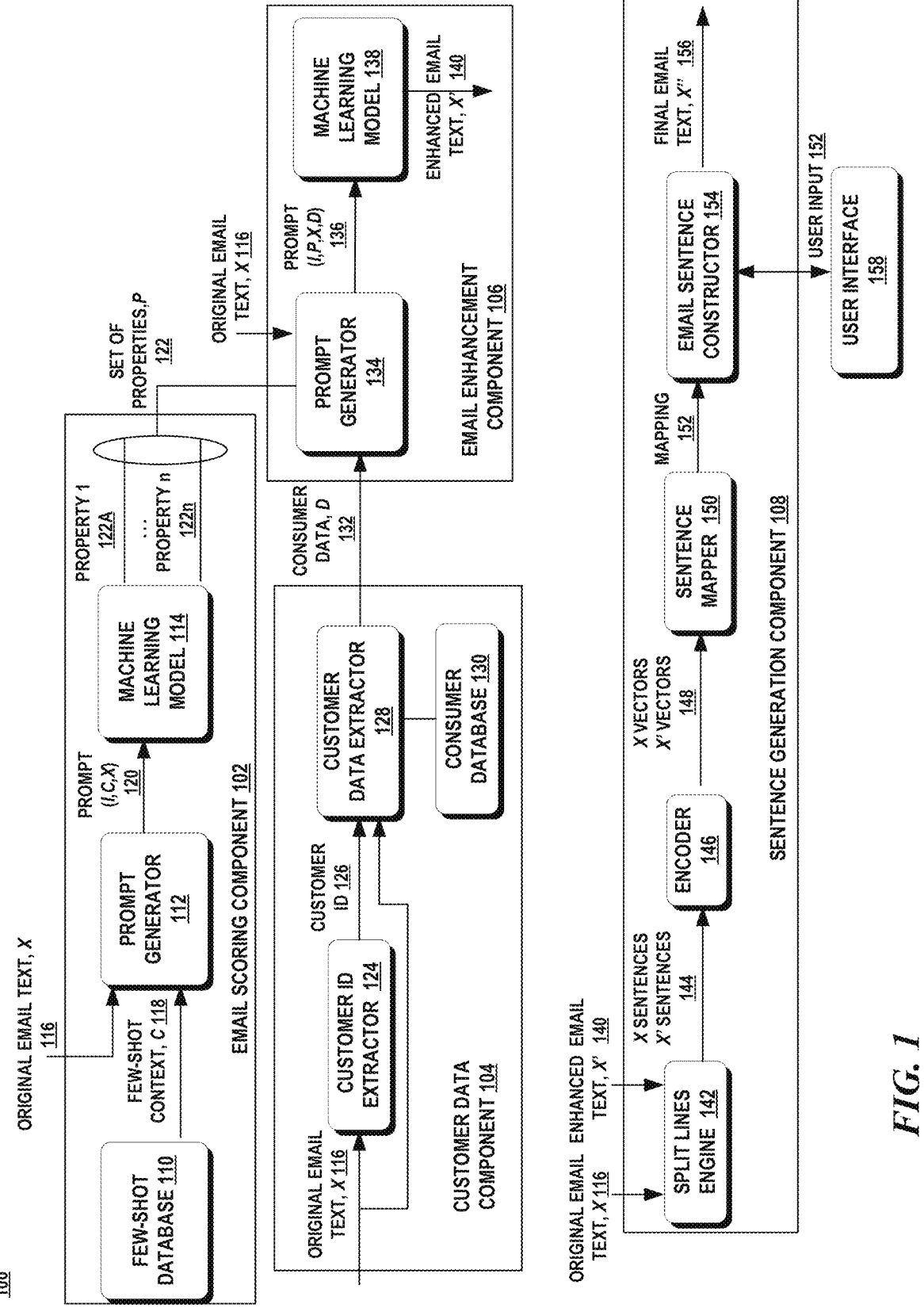
FIG. 1 is a schematic diagram illustrating an exemplary system for enhancing an email text using machine learning.

FIG. 1 illustrates a block diagram of an exemplary email processing system 100 having an email scoring component 102, a consumer data component 104, an email enhancement component 106, and a sentence generation component 108.

The email scoring component 102 identifies the effectiveness of an email text in providing a clear, concise, grammatically-correct, and professionally-written communication. The effectiveness of the email text is based on a set of properties 122. A property is a characteristic needed to be effective for an email of a particular domain. A domain is a particular audience such as sales customers, internal corporate staff, users of a product or service, work colleagues, and the like.

In an aspect, the set of properties 122 includes the following:

(1) Clear call to action—A call to action is a piece of text that invites a reader to take action, such as read an article or buy a product. A clear call to action contains a verb that tells the reader what to do. A clear call to action is needed for the recipient to understand what to do next.

(2) Clear value proposition—A value proposition is a statement that answers how a product or service will solve a problem and why it is better than others. A clear value proposition is used so the recipient of the email understands why the recipient should be interested in a product or service thereby motivating the recipient to take action.

(3) Personalized—The content of the email is customized for the recipient using relevant details such as a name or past interactions.

(4) Sense of urgency—The email encourages quick action with time-sensitive information (e.g., "Limited-time offer," "Membership renewal").

(5) Pain points and recipient needs—The email addresses the recipient's challenges or needs and offers a solution.

(6) Professional—The tone and language of the email are polished and respectful, avoiding anything that could come across as unprofessional.

(7) Not too wordy—The content is to the point without the use of overly-worded sentences.

(8) Balanced exclamation mark usage—The email uses exclamation marks sparingly.

(9) Confident—The email shows confidence in the product, service or information presented.

(10) Concise—The email is clear and concise without elaborating on unnecessary details.

(11) No spam-related words—The email does not use words or phrases commonly associated with spam (e.g., "Free money", "Act now!").

In an aspect, the email scoring component 102 comprises a few-shot database 110, a prompt generator 112, and a machine learning model 114. An original email text 116 is scored using a machine learning model 114 against the set of properties 122A-122N. A prompt 120 is generated by a prompt generator 112 and includes instructions, I, the original email text, X, and a few-shot context, C, 118.

The prompt 120 is the input to the machine learning model 114. The natural language text of the prompt is transformed into tokens. A token is a smaller portion of the text of the prompt and can represent a word, a character, or sequence of characters. Each token is replaced with a corresponding embedding and the sequence of token embeddings representing the data of the prompt has to fit within the size of the context window of the machine learning model.

The prompt 120 is sent to the machine learning model 114 and the model 114 outputs a value for each property in the set of properties 122. The value indicates whether or not a particular property is exhibited in the original email text.

The few-shot context 118 includes sample email texts exhibiting each property of the set of properties. The few-shot context 118 is stored in a few-shot database 110. In an aspect, a few-shot context 118 includes a set of email samples that exhibit one or more of the properties. These properties are represented collectively rather than individually. An email sample is labeled with the properties that the email sample exhibits and the properties that are missing. The label may consist of a "Yes" or "No" for each property.

The customer data component 104 accesses customer or personal data 132 related to the original email text 116 from a consumer database 130. The customer data component 104 includes a customer identifier (ID) extractor 124, a customer data extractor 128, and a consumer database 130. The customer ID extractor 124 obtains the email address of the sender of the original email text 116 which is then used by the customer data extractor 128 to access the data of the consumer associated with the customer ID 126. The consumer database 130 contains data of the customers of a business enterprise.

In an aspect, the consumer database 130 may be part of a Customer Relationship Management (CRM) system. A CRM system stores data from various sources including a company's website, email records, chat sessions, marketing materials, social media, sales records, accounting records, etc. In other aspects, the consumer database 130 may be a Structured Query Language (SQL), rational database. The customer data component 104 may generate a query to the database 130 by translating portions of the email content into a database query.

In an aspect, the email address of the sender is used as an identifier to search for the customer data from the consumer database that pertains to the original email text. All fields in the consumer database that are related to the sender are extracted and the associated data (e.g., meetings, activities, tasks, etc.) and provided to the model. The language model is instructed to analyze all the retrieved CRM data and determine whether any of it is relevant to the current email text. It performs this analysis by comparing the email text with the context data (e.g., meetings, activities, etc.) and selects the most relevant information. This relevant data is then included in the context of the model's prompt, enhancing the model's ability to generate or respond accurately to the email.

The email enhancement component 106 includes a prompt generator 134 and a machine learning model 138. The prompt generator 134 receives the customer data 132, D, the original email text, 116, X, and the set of properties for the original email text, 122, P. Instructions are generated that instruct the model on the task it is to perform with a description of the customer data, original email text, a set of missing properties and the intended output. The prompt generator 134 generates the prompt 136 to the machine learning model which includes instructions, I, the missing properties, P, the original email text, X, and the relevant customer data, D. The machine learning model 138 receives the prompt 136 and outputs an enhanced email text, X', 140.

The sentence generation component 108 generates the final email text, 156, X". In an aspect, the sender of the original email may elect to use the enhanced email text 140 without editing it. In another aspect, the sender of the original email may want to replace select sentences in the original email text with sentences from the enhanced email text. The sentence generation component 108 maps each sentence in the original email text to one or more sentences in the enhanced email text and presents the new sentences to the user in a user interface 158. The user may accept or reject one or more of the new sentences.

The sentence generation component 108 includes a split lines engine 142, an encoder 146, a sentence mapper 150, and an email sentence constructor 154. The split lines engine 142 partitions the enhanced email text into sentences. The encoder 146 generates an encoding or embedding vector for each sentence in the original email text and the enhanced email text. The sentence mapper 150 maps each sentence in the original email text with one or more corresponding sentences in the enhanced email text based on similar embeddings. The email sentence constructor 154 presents to the user the mapped sentences and upon user input, creates a final email text that includes the sentences accepted by the user.

Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

In an aspect, the machine learning model is a neural transformer model with attention. There are various configurations of a neural transformer model with attention. In an aspect, the model is configured as an encoder-decoder neural transformer model with attention having a series of stacked encoder blocks coupled to a series of stacked decoder blocks. In another aspect, the model consists only of stacked decoder blocks. In addition, the model may be trained to perform different tasks and/or may be configured in different model sizes (i.e., different number of parameters).

In an aspect, the model is pre-trained on natural language text. The training of a machine learning model requires a considerable amount of training data and computing resources which makes it impossible for some developers to create their own models. The model may consist of billions of parameters (e.g., weights, biases, embeddings) from being trained on terabytes of data and these models are referred to as a large language model. Examples of a large language model includes the pre-trained generative neural transformer models with attention offered by OpenAI i.e., ChatGPT and Codex models, PaLM and Chinchilla by Google, LLaMa by Meta, MAI-1 and Phi-3 models by Microsoft, etc.

In an aspect, the machine learning model used in the email scoring component may be different from the machine learning model used in the email enhancement component. The advantage of using two separate models lies in optimizing cost and performance. For example, the email scoring task is relatively simpler and may not require the same level of complexity as the email enhancement task. Therefore, a more cost-effective or "cheaper" model could be used for scoring thereby reducing the overall cost of the process. On the other hand, the email enhancement task might require a more powerful model that can handle longer context and more complex instructions, even though it may be more expensive to use. This flexibility allows us to choose the best model for each specific task, depending on the needs and budget.

Methods

Attention now turns to a more detailed description of the methods used in the system for email text enhancement. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
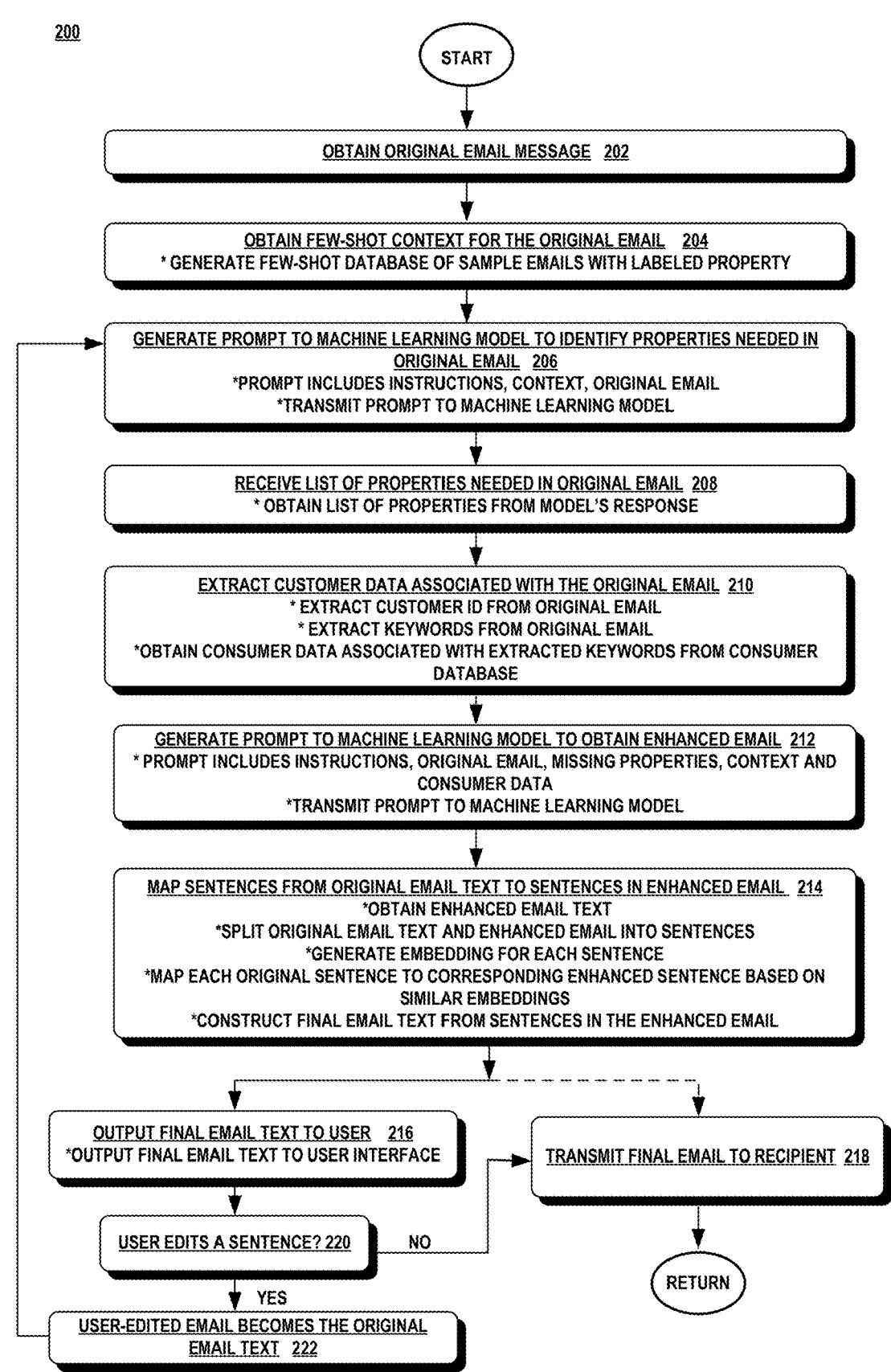
FIG. 2 is a flow diagram illustrating an exemplary method for generating the enhanced email text.

Turning to FIG. 2, there is shown an exemplary method for email text enhancement 200. An original email text is obtained (block 202). The original email text may be a draft of an email message being crafted in an email service. The email service may utilize the email text enhancement technique disclosed herein to enrich an email message with consumer data, to utilize a particular style, or to incorporate different words and phrases that appear more professional.

A few-shot database contains a set of labeled email message samples. The label indicates whether or not the sample email message exhibits each of the properties. The email scoring component extracts the few-shot context from the few-shot database (block 204). The samples of the few-shot context may be obtained from well-known collections or manually generated.

Turning to FIG. 5 there is shown an exemplary few-shot context 500. The few-shot context 500 includes several sample email messages, <Sample Email 1>, <Sample Email 2>, each labeled with the properties contained in the email message and those that are missing. As shown in FIG. 5, the sample email message 502 includes a set of properties 504.

The set of properties indicate whether or not a property is satisfied (Yes) or missing (No).

Turning back to FIG. 2, a prompt is then generated for a machine learning model to identify the properties missing from the original email text. The prompt includes instructions, the few-shot context and the original email text (block 206). The instructions indicate what the model is to do and the purpose of the few-shot context and original email text.

Turning to FIG. 6, there is shown an exemplary prompt 600 for the machine learning model to identify the missing properties in an original email text. The prompt includes an instruction 602 which instructs the model on the task of identifying the properties that exist in the original email text and the properties that need to be in the original email text. The prompt includes the instructions 602, the original email text 604 and the few shot context 606.

Turning back to FIG. 2 the prompt is then transmitted to the machine learning model (block 206). The prompt to the machine learning model may be issued using an Application Programming Interface (API). In an aspect, a remote server hosts the machine learning model and a computing device hosts the email service. The email service and the remote server communicate through HTTP-based Representational State Transfer (REST) APIs. A REST API or web API is an API that conforms to the REST protocol. In the REST protocol, the remote server hosting the machine learning model contains a publicly-exposed endpoint having a defined request and response structure. The email service issues web APIs containing the prompt to the remote server to instruct the machine learning model to perform the intended task.

The email scoring component receives the response from the machine learning model (block 208). In an aspect, the machine learning model returns a binary score for each property representing a "Yes" or a "No." The "Yes" score represents that a property is satisfied. The "No" score indicates that the property is not satisfied. It should be noted that the binary score is not constrained to "Yes" or "No" and may utilize '1' or '0' or other binary symbols.

The original email message is then analyzed to extract consumer data that can enhance the original email message (block 210). In an aspect, the email service is connected to a consumer database that contains data of the sender of the original email. The email address of the sender of the original email is used to access the data of the sender in the consumer database. The data fields of the sender from the consumer database that pertain to the original email text are extracted. The customer data extractor extracts keywords from the original email text that are used to obtain the pertinent data fields from the consumer database. The model is capable of identifying which data can enhance the email based on these instructions.

A prompt is generated for a machine learning model to generate an enhanced email message (block 212). The prompt includes instructions, the missing properties, the few-shot context, and the original email text. The instructions indicate the task the model is to perform with the missing properties, the few-shot context, and the original email text. The instructions given to the model indicate that the model is to maintain similarity in the structure and the sender's writing style in order to minimize a drastic rewrite.

Turning to FIG. 7, there is shown an exemplary prompt 700 for the machine learning model to enhance the original email text with the missing properties. The prompt includes instructions 702A which instruct the model on the task of enhancing the email text by incorporating text that addresses the missing properties and instructions 702B that personalize the email with relevant CRM data. The prompt also includes the original email text {email} 704, the missing properties revised_email_improved_properties: {properties_ to_improve_str} 706, and CRM data crm_data: {crm_data}.

Turning back to FIG. 2, the sentence generation component generates a final email text that includes sentences from the original email and/or the enhanced email (block 214). In some situations, the enhanced sentences may include content added to the sentences of the original email. In other situations, the sentences in the entire original email may be replaced by the sentences in the enhanced email or select sentences in the original email text may be replaced by one or more sentences in the enhanced email.

For an original email X and the corresponding enhanced email X', the initial step is to split the original mail and the enhanced mail into respective sentences using the split lines engine. In an aspect, the split lines engine includes the "splitlines" method of Python. The sentences in the original and the enhanced email are represented as:

$X_{sentences}=[x_1, \ldots, x_m, X'_{sentences}=[x'_1, \ldots, x'_s]$, where there are m number of sentences in the original email, X, and s number of sentences in the enhanced email, X'

Next, embeddings are generated for each sentence. An embedding is a learned vector representation for text-based tokens where tokens that have a common meaning have a common representation. The embeddings for each sentence are generated by an encoder, such as Word2Vec, Bidirectional Encoder Representations from Transformers (BERT), neural encoder transformer model with attention, and the like. (Collectively, block 214).

A distance measure is used to determine the similarity between the embedding vectors of the original sentences from the original email and the embedding vectors of the enhanced sentences from the enhanced email. In an aspect, cosine similarity is used to measure the similarity. However, other distance measures may be used such as Euclidean distance, Manhattan distance, etc. maybe used. (Collectively, block 214).

Next, a mapping is performed between the sentences in the original mail and the enhanced email. For each sentence i in the original email, a search is made for the sentence within the subsequent K sentences in X' having the closest similarity to the embedding of the original sentence i, where K is a hyperparameter. The search process iterates for each sentence i in the original email to find the closest match in X. Assuming that in iteration i–1, sentence j in X' was selected, then the search for the closest similar sentence in X' is selected from sentences in the range [j+1, j+K] in X'. If the chosen index is greater than j+1, a mapping is established between sentence i in X and the sentences from j+1 up to the chosen index in X'. (Collectively, block 214).

This mapping method is used for addressing situations where there is a disparity in the number of sentences in the original email and in the enhanced email. It enables a versatile mapping approach that can link a single sentence in one email to multiple sentences in the other, or link multiple sentences to a single sentence, as required. (Collectively, block 214).

In an aspect, the final email text is transmitted directly to the intended recipient (block 218). In another aspect, the final email text is displayed for the user or sender of the original email in a user interface (block 216). The user may make edits to the final email text (block 220—yes). In this case (block 220—yes), the process repeats ensuring that the user-edited email adheres to the set of properties (blocks 206-214). When there are no further user edits to the final email (block 220—no), the final email is transmitted to the intended recipient (block 218).

Performance Improvement

Attention now turns to FIG. 3 which illustrates the performance improvement of the disclosed technique. There is shown a comparison of the success percentages, per property, between a set of original emails and their corresponding enhanced emails. A dataset of marketing emails representing interactions between sellers and customers was used. A baseline measure was generated by using the machine learning model to compute the probability distribution for the set of properties for each email sample of the dataset. An enhanced email was generated and a second probability distribution for the set of properties was generated. The count for each property was tallied at each step. Finally, the ratio of the original emails against the ratio of the enhanced emails for each property was computed.

FIG. 3 shows the improvement in terms of the success percentage between the original email and the enhanced email for each property. As shown in FIG. 3, there was no improvement for the "Clear Call to Action" property, the "Clear value proposition" property, the "Pain points and recipient needs" property, the "Professional" property, the "Confident" property, and the "No spam-related words" property for both the original and enhanced emails since the success percentages are the same 100%. For the "Sense of Urgency" property, the original emails had a success percentage of 6% and the success percentage for the enhanced email improved to 16%. Other improvements were seen in the "Personalized", "Not too wordy", "Balanced exclamation usage", and "Concise" properties. Overall, the technique improves the email communication by generating an enhanced email message.

Operating Environments

Figure 4:
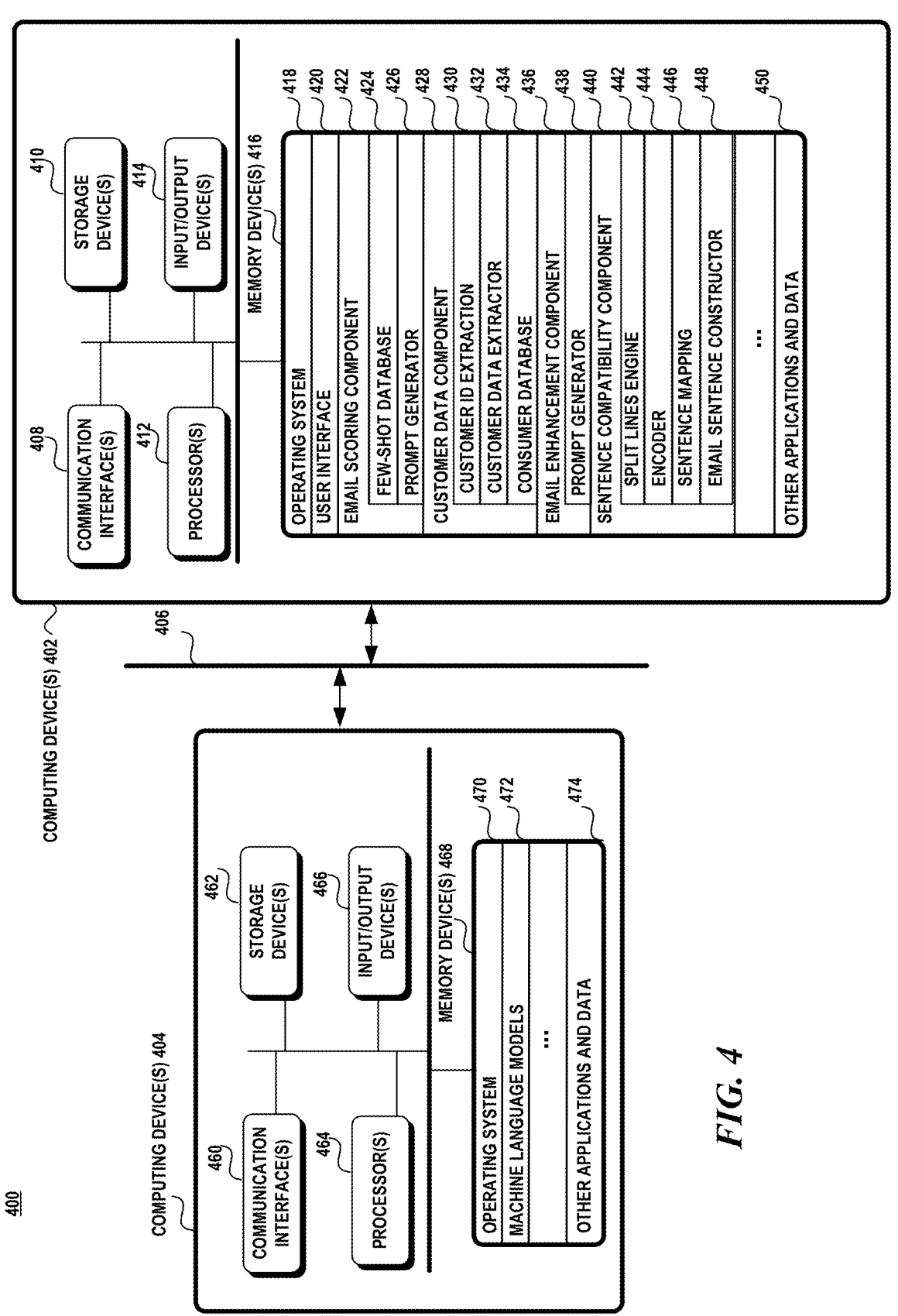
FIG. 4 is a block diagram illustrating an exemplary operating environment.

Attention now turns to a discussion of an exemplary operating environment 400. FIG. 4 illustrates an exemplary operating environment 400 having one or more computing devices 402, 404 communicatively coupled to a network 406. In one aspect, the generation of the enhanced email text may be processed on one computing device 402 and the machine learning models may be hosted as a service on a second computing device 404. In another aspect, the machine learning models may be hosted in the same web service that produces the enhanced email communication. The aspects of the operating environment are not constrained to a particular configuration.

The computing devices 402, 404 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

A computing device 402, 404 may include one or more processors 412, 464, one or more communication interfaces 408, 460, one or more storage devices 410, 462, one or more input/output devices 414, 466, and one or more memory devices 416, 468. A processor 412, 464 may be any commercially available or customized processor and may include dual microprocessors and multi-processor architectures. A communication interface 408, 460, facilitates wired or wireless communications between the computing device 402, 404 and other devices. A storage device 410, 462 may be computer-readable medium that does not contain propagating signals, such as modulated data signals transmitted through a carrier wave. Examples of a storage device 410, 462 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 410, 462, in a computing device 402, 404. The input/output devices 414, 466 may include a keyboard, mouse, pen, voice input device, touch input device, display, speakers, printers, etc., and any combination thereof.

A memory device 416, 468 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 416, 468 may also include one or more external storage devices or remotely located storage devices that do not pertain to propagated signals, such as modulated data signals transmitted through a carrier wave.

The memory device 416, 468 may contain instructions, components, and data. A component is a software program that performs a specific function and is otherwise known as a module, program, component, and/or application. Memory device 416 may include an operating system 418, a user interface 420, an email scoring component 422 that includes a few-shot database 424 and a prompt generator 426, a customer data component 428 that includes a customer ID extractor 430, a customer data extractor 432, a customer database 434, an email enhancement component 436 that includes a prompt generator 438, a sentence compatibility component 440 that includes a split lines engine 442, an encoder 444, a sentence mapper 446, and an email sentence constructor 448, and other applications and data 450. Memory device 468 may include an operating system 470, one or more machine learning models 472, and other applications and data 474.

The computing devices 402, 404 may be communicatively coupled via a network 406. The network 406 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 406 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed pertain to the technical problem of enhancing email communications. The technical features associated with addressing this problem is the identification of the missing properties not present in an email communication and the generation of an enhanced email communication that satisfies the missing properties. The technical effect achieved is the reduction of the computing resources used by the computing device to generate and transmit email communications.

Conclusion

The techniques described herein are an improvement over prior solutions. One prior solution involved providing the email text to a language model (LLM) with basic instructions, such as improving grammar or making the text sound better. This technique is an improvement because it introduces a scoring step to identify a set of specific properties for a particular domain, such as the sales domain (e.g., seller-customer interactions). In addition to regular instructions, this technique focuses on improving the missing properties and incorporates relevant CRM data, adding personalized information to enhance the email further.

Hence, the technique described herein is advantageous over the prior solution since it generates an email communication that is tailored and context-aware to the particular domain while the email is being crafted. In this manner, the number of subsequent email communications transmitted between the parties is reduced.

One of ordinary skill in the art understands that the techniques disclosed herein are inherently digital. The operations used to generate the missing properties and to generate the enhanced email text are inherently digital. The operations of the machine learning model are not capable of being performed within the human mind. The few-shot learning of the model through the few shot context and the identification of the missing properties cannot be performed within the human mind. The human mind cannot interface directly with a CPU or network interface card, or other processor, or with RAM or other digital storage, to read or write the necessary data and perform the necessary operations disclosed herein.

The embodiments are also presumed to be capable of operating at scale, within tight timing constraints in production environments and in testing labs for production environments as opposed to being mere thought experiments. Hence, the human mind cannot perform the operations described herein in a timely manner and with the accuracy required for these intended uses.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

A system is disclosed, comprising: a processor; and a memory that stores a program that is configured to be executed by the processor. The program includes instructions to perform actions that: obtain an original email message, wherein the original email message comprises a plurality of original sentences; obtain a plurality of properties, wherein a property identifies a characteristic needed for a professionally-written email; determine that the original email message is missing at least one property of the plurality of properties; generate an enhanced email message for the original email message, wherein the enhanced email message comprises a plurality of enhanced sentences, wherein at least one of the plurality of enhanced sentences adheres to the missing property; produce a mapping of one or more original sentences of the original email message into one or more of the plurality of enhanced sentences; select ones of the plurality of enhanced sentences to replace the one or more original sentences based on the mapping; and construct a new email message from the select ones of the plurality of enhanced sentences.

In an aspect, the program includes instructions to perform actions that: obtain a context, wherein the context comprises a plurality of labeled email messages, wherein each labeled email message is marked with a select one of the plurality of properties.

In an aspect, the program includes instructions to perform actions that: invoke a first machine learning model to determine that the original email message is missing the at least one property of the plurality of properties, wherein the first machine learning model is given the original email message and the context.

In an aspect, the program includes instructions to perform actions that: extract consumer data associated with a sender of the original email message from a consumer database. In an aspect, the program includes instructions to perform actions that: invoke a second machine learning model to generate the enhanced email message, wherein the second machine learning model is given, the original email message, the at least one missing property, and the consumer data.

In an aspect, a property comprises clear call to action, clear value proposition, personalized, sense of urgency, pain points and recipient needs, professional, not too wordy, balanced exclamation usage, confident, concise, or no spam-related words.

In an aspect, the program includes instructions to perform actions that: display a select one of the enhanced sentences; and upon user input, replace a corresponding original sentence with the select one of the enhanced sentences.

A computer-implemented method is disclosed, comprising: accessing an original email message, wherein the original email message comprises a plurality of original sentences;

accessing a plurality of properties, wherein a property identifies a feature of a well-written email; determining that the original email message does not adhere to one or more properties of the plurality of properties; generating an enhanced email message for the original email message, wherein the enhanced email message comprises a plurality of enhanced sentences, wherein the plurality of enhanced sentences adheres to the plurality of properties; producing a mapping of one or more original sentences of the original email message to one or more of the pluralities of enhanced sentences; selecting ones of the plurality of enhanced sentences to replace the one or more original sentences based on the mapping; and constructing a new email message from the select ones of the plurality of enhanced sentences.

In an aspect, the computer-implemented method comprises: presenting in a user interface the select ones of the plurality of enhanced sentences to replace the one or more original sentences; and upon user input, replacing the designated select ones of the plurality of enhanced sentences to replace the one or more original sentences.

In an aspect, determining that the original email message does not adhere to one or more properties of the plurality of properties, further comprises: obtaining the one or more properties of the plurality of properties from a machine learning model, wherein the machine learning model is given the original email message and a few-shot context.

In an aspect, the few-shot context comprises sample email texts labeled with a corresponding property. In an aspect, the computer-implemented method, further comprises: extracting personal data from a consumer database relevant to the original email message.

In an aspect, generating an enhanced email message for the original email message further comprises: invoking a machine learning model to generate the enhanced email message, wherein the machine learning model is given the original email message, the one or more properties, the few-shot context, and the personal data.

In an aspect, selecting ones of the plurality of enhanced sentences to replace the one or more original sentences based on the mapping further comprises: prior to replacing the one or more original sentences, determining that the enhanced email message adheres to the plurality of properties.

In an aspect, a property comprises clear call to action, clear value proposition, personalized, sense of urgency, pain points and recipient needs, professional, not too wordy, balanced exclamation usage, confident, concise, or no spam-related words.

A hardware storage device is disclosed having stored thereon computer executable instructions that are structured to be executable by a processor of a computing device to thereby cause the computing device to perform actions that: access an original email message comprising a plurality of original sentences; access a plurality of properties, wherein a property is a characteristic of a professionally-written email; determine that the original email message does not contain one or more properties of the plurality of properties; generate an enhanced email message for the original email message, wherein the enhanced email message comprises a plurality of enhanced sentences, wherein the plurality of enhanced sentences contains each of the plurality of properties; map the original sentences of the original email message to a corresponding enhanced sentence of the plurality of enhanced sentences; and construct a new email message by replacing select ones of the original sentences with one or more enhanced sentences based on the mapping.

In an aspect, the hardware storage device has stored thereon computer executable instructions that are structured to be executable by a processor of a computing device to thereby cause the computing device to perform actions that: generate an embedding for each of the plurality of original sentences and for each of the plurality of enhanced sentences; find an embedding of an enhanced sentence that closely matches an embedding of an original sentence; and map the original sentence to the enhanced sentence having the closely matching embedding.

In an aspect, the hardware device has stored thereon computer executable instructions that are structured to be executable by a processor of a computing device to thereby cause the computing device to perform actions that: invoke a machine learning model to generate the plurality of properties, wherein the machine learning model learns to generate the plurality of properties given a few-shot context, wherein the few-shot context comprises labeled samples of email messages.

In an aspect, the hardware device has stored thereon computer executable instructions that are structured to be executable by a processor of a computing device to thereby cause the computing device to perform actions that: invoke a machine learning model to generate the enhanced email message, wherein the machine learning model is given the original email message, the one or more properties, and a few-shot context, and personal data relevant to content of the original email message, wherein the few-shot context includes sample email messages labeled with at least one property.

In an aspect, a property comprises clear call to action, clear value proposition, personalized, sense of urgency, pain points and recipient needs, professional, not too wordy, balanced exclamation usage, confident, concise, or no spam-related words.

What is claimed:

1. A system, comprising:

a processor; and a memory that stores a program that is configured to be executed by the processor, the program includes instructions to perform actions that:

obtain an original email message, wherein the original email message comprises a plurality of original sentences;

obtain a plurality of properties, wherein a property identifies a characteristic needed for a professionally-written email;

determine that the original email message is missing at least one property of the plurality of properties;

generate an enhanced email message for the original email message, wherein the enhanced email message comprises a plurality of enhanced sentences, wherein at least one of the plurality of enhanced sentences adheres to the missing property;

produce a mapping of one or more original sentences of the original email message into one or more of the plurality of enhanced sentences;

select ones of the plurality of enhanced sentences to replace the one or more original sentences based on the mapping; and construct a new email message from the select ones of the plurality of enhanced sentences.

2. The system of claim 1, wherein the program includes instructions to perform actions that:

obtain a context, wherein the context comprises a plurality of labeled email messages, wherein each labeled email message is marked with a select one of the plurality of properties.

3. The system of claim 1, wherein the program includes instructions to perform actions that:

invoke a first machine learning model to determine that the original email message is missing the at least one property of the plurality of properties, wherein the first machine learning model is given the original email message and the context.

4. The system of claim 3, wherein the program includes instructions to perform actions that:

extract consumer data associated with a sender of the original email message from a consumer database.

5. The system of claim 4, wherein the program includes instructions to perform actions that:

invoke a second machine learning model to generate the enhanced email message, wherein the second machine learning model is given, the original email message, the at least one missing property, and the consumer data.

6. The system of claim 1, wherein a property comprises clear call to action, clear value proposition, personalized, sense of urgency, pain points and recipient needs, professional, not too wordy, balanced exclamation usage, confident, concise, or no spam-related words.

7. The system of claim 1, wherein the program includes instructions to perform actions that:

display a select one of the enhanced sentences; and upon user input, replace a corresponding original sentence with the select one of the enhanced sentences.

8. A computer-implemented method, comprising:

accessing an original email message, wherein the original email message comprises a plurality of original sentences;

accessing a plurality of properties, wherein a property identifies a feature of a well-written email;

determining that the original email message does not adhere to one or more properties of the plurality of properties;

generating an enhanced email message for the original email message, wherein the enhanced email message comprises a plurality of enhanced sentences, wherein the plurality of enhanced sentences adheres to the plurality of properties;

producing a mapping of one or more original sentences of the original email message to one or more of the pluralities of enhanced sentences;

selecting ones of the plurality of enhanced sentences to replace the one or more original sentences based on the mapping; and constructing a new email message from the select ones of the plurality of enhanced sentences.

9. The computer-implemented method of claim 8, further comprising:

presenting in a user interface the select ones of the plurality of enhanced sentences to replace the one or more original sentences; and upon user input, replacing the designated select ones of the plurality of enhanced sentences to replace the one or more original sentences.

10. The computer-implemented method of claim 8, wherein determining that the original email message does not adhere to one or more properties of the plurality of properties, further comprises:

obtaining the one or more properties of the plurality of properties from a machine learning model, wherein the machine learning model is given the original email message and a few-shot context.

11. The computer-implemented method of claim 10, wherein the few-shot context comprises sample email texts labeled with a corresponding property.

12. The computer-implemented method of claim 8, further comprising:

extracting personal data from a consumer database relevant to the original email message.

13. The computer-implemented method of claim 12, wherein generating an enhanced email message for the original email message further comprises:

invoking a machine learning model to generate the enhanced email message, wherein the machine learning model is given the original email message, the one or more properties, the few-shot context, and the personal data.

14. The computer-implemented method of claim 8, wherein selecting ones of the plurality of enhanced sentences to replace the one or more original sentences based on the mapping further comprises:

prior to replacing the one or more original sentences, determining that the enhanced email message adheres to the plurality of properties.

15. The computer-implemented method of 8, wherein a property comprises clear call to action, clear value proposition, personalized, sense of urgency, pain points and recipient needs, professional, not too wordy, balanced exclamation usage, confident, concise, or no spam-related words.

16. A hardware storage device having stored thereon computer executable instructions that are structured to be executable by a processor of a computing device to thereby cause the computing device to perform actions that:

access an original email message comprising a plurality of original sentences;

access a plurality of properties, wherein a property is a characteristic of a professionally-written email;

determine that the original email message does not contain one or more properties of the plurality of properties;

generate an enhanced email message for the original email message, wherein the enhanced email message comprises a plurality of enhanced sentences, wherein the plurality of enhanced sentences contains each of the plurality of properties;

map the original sentences of the original email message to a corresponding enhanced sentence of the plurality of enhanced sentences; and construct a new email message by replacing select ones of the original sentences with one or more enhanced sentences based on the mapping.

17. The hardware storage device of claim 16 having stored thereon computer executable instructions that are structured to be executable by a processor of a computing device to thereby cause the computing device to perform actions that:

generate an embedding for each of the plurality of original sentences and for each of the plurality of enhanced sentences;

find an embedding of an enhanced sentence that closely matches an embedding of an original sentence; and map the original sentence to the enhanced sentence having the closely matching embedding.

18. The hardware device of claim 16, having stored thereon computer executable instructions that are structured to be executable by a processor of a computing device to thereby cause the computing device to perform actions that:

invoke a machine learning model to generate the plurality of properties, wherein the machine learning model learns to generate the plurality of properties given a few-shot context, wherein the few-shot context comprises labeled samples of email messages.

19. The hardware device of claim 16, having stored thereon computer executable instructions that are structured to be executable by a processor of a computing device to thereby cause the computing device to perform actions that:

invoke a machine learning model to generate the enhanced email message, wherein the machine learning model is given the original email message, the one or more properties, and a few-shot context, and personal data relevant to content of the original email message, wherein the few-shot context includes sample email messages labeled with at least one property.

20. The hardware device of claim 16, wherein a property comprises clear call to action, clear value proposition, personalized, sense of urgency, pain points and recipient needs, professional, not too wordy, balanced exclamation usage, confident, concise, or no spam-related words.

\* \* \* \* \*